(12) United States Patent
Fall

(10) Patent No.: US 7,131,348 B2
(45) Date of Patent: Nov. 7, 2006

(54) PEDAL ARRANGEMENT IN A VEHICLE CAB

(75) Inventor: Peter Fall, Västra Frölunda (SE)

(73) Assignee: Volvo Car Corporation (SE)

( * ) Notice: Subject to any disclaimer, the term of this patent is extended or adjusted under 35 U.S.C. 154(b) by 556 days.

(21) Appl. No.: 09/681,441

(22) Filed: Apr. 5, 2001

(65) Prior Publication Data

US 2001/0039848 A1    Nov. 15, 2001

(30) Foreign Application Priority Data

Apr. 5, 2000 (SE) .................................. 0001244

(51) Int. Cl.
*G05G 1/14* (2006.01)
*B60K 28/10* (2006.01)

(52) U.S. Cl. .......................... 74/512; 74/560; 180/274
(58) Field of Classification Search .................. 74/512, 74/513, 560; 180/274
See application file for complete search history.

(56) References Cited

U.S. PATENT DOCUMENTS

| | | | |
|---|---|---|---|
| 2,270,901 A | | 1/1942 | Rusbissow |
| 3,795,295 A | * | 3/1974 | Reno ........................ 74/512 X |
| 3,859,866 A | * | 1/1975 | De Grazia ................ 74/560 X |
| 4,106,601 A | * | 8/1978 | Fisher ....................... 74/512 X |
| 4,224,832 A | * | 9/1980 | Prohaska et al. ......... 74/512 X |
| 5,797,467 A | * | 8/1998 | Watanabe .................. 74/512 X |
| 6,082,219 A | * | 7/2000 | Wolpert ........................ 74/512 |
| 6,364,046 B1 | * | 4/2002 | Forssell et al. ............. 180/275 |

FOREIGN PATENT DOCUMENTS

| | | | | |
|---|---|---|---|---|
| DE | 3140329 A | | 4/1983 | |
| DE | 19706692 C | | 6/1998 | |
| FR | 2492923 A | | 4/1982 | |
| FR | 2495070 | * | 6/1982 | .................. 74/512 |
| FR | 2555333 | * | 5/1985 | .................. 74/512 |
| FR | 2751441 | * | 1/1998 | .................. 74/512 |
| JP | 8-132916 | * | 5/1996 | .................. 74/512 |
| JP | 2000-238550 | * | 9/2000 | .................. 74/512 |
| SE | 9800420 | | 9/1998 | |
| WO | WO 9960457 A | | 11/1999 | |

OTHER PUBLICATIONS

Harold A. Rothbart, Mechanical Design and Systems Handbook, 1964, McGraw-Hill Book Company, pp. 15-2 to 15-16.*

* cited by examiner

*Primary Examiner*—Vinh T. Luong
(74) *Attorney, Agent, or Firm*—Fitch, Even, Tabin & Flannery

(57) ABSTRACT

A pedal arrangement in a vehicle cab including a support (5) fixed in the cab, in which a pedal arm (2) is mounted for pivoting about a pivot axis (4) spaced from both ends (2*a*, 2*b*) of the pedal arm. At its upper end, the pedal arm is joined to one end of a flexible rod (12), such as a steel cable, which can transmit tensile force to an operating lever (11), but which bends if subjected to compressive force.

18 Claims, 2 Drawing Sheets

PEDAL ARRANGEMENT IN A VEHICLE CAB

BACKGROUND OF THE INVENTION

It has been recognized that drivers sometime suffer injuries in automobile accidents that can not necessarily be explained as having been directly caused by accident impacts. It has instead been appreciated that these injuries can be associated with certain actions of the foot pedals during a crash. With respect to a brake pedal, an operating device may be included, for example a brake servo unit, that is fixed to the outside of an intermediate wall between the cab and the engine compartment. The servo unit has a push rod which extends through the intermediate wall. The pedal arm is usually pivotally journaled at its upper end and acts on a push rod for affecting braking at a point located on the arm below the journal. In a collision in which the intermediate wall is pressed into the cab, the servo unit, together with its push rod, will pivot the pedal arm upwards, often resulting in major injury to the feet and shins.

In order to avoid the pedal arm being pivoted upwards in this manner if the servo unit is displaced in towards the cab, it is previously known, as for example in Swedish Patent Application No. SE 9800420, to journal the pedal arm at a point remote from its upper end and to pivotally join the upper end of the pedal arm to one end of a motion-transmitting rod. The other end of the pedal arm is pivotally joined to one end of a pivotally mounted lever which, when pivoted, actuates the push rod of the servo unit. In a collision that causes the servo unit to be pressed in towards the cab, the pedal arm is pivoted down towards the cab floor. Even though this design can reduce the risk of injury to the shins of the driver, it can cause other serious injury if the driver's foot happens to be directly under the pedal at the moment of collision and is clamped between the pedal and the cab floor. This is especially serious if the driver should be held fast so that he or she cannot rapidly leave the vehicle in such event as an ensuing fire following the accident.

SUMMARY OF INVENTION

The purpose of the present invention is to achieve a pedal arrangement which eliminates the risk of a foot being clamped and held fast between the underside of the pedal and the floor of the vehicle cab in a collision that has caused displacement of a brake servo unit, for example, in towards the cab.

This is achieved according to the present invention by virtue of the fact that the motion-transmitting element is disposed so that the distance between its attachment points to the respective arms is maintained at least substantially constant when there is a tensile force on the element, but is allowed to be shortened when there is compressive force. In a preferred embodiment, the motion-transmitting element is a metal cable, which can transmit tensile force, for example, in the operation of the brake pedal during normal braking. Such a cable will, however, bend when subjected to compressive force so that it cannot press down the pedal and thereby avoids the potential clamping of a driver's foot if the associated servo unit is pushed in towards the vehicle cab in a collision.

The pedal arrangement shown and described in the above mentioned SE 9800420 has no less than five pivot points between the pedal arm and the push rod of the servo unit. Each pivot point is a potential source of play, at least after a certain amount of use, and the more pivot points there are, the greater will be the total play. By using a flexible cable, at least one pivot point, and in certain cases two pivot points, can be eliminated by rigidly attaching the ends of the wires to the respective arm, for example, by welding. In this manner, the play in the system is reduced. An additional advantage with a cable is that greater tolerances can be permitted without sacrificing function.

In at least one embodiment, the present invention relates to a pedal arrangement in a vehicle cab. The arrangement includes a support fixed in the cab and at least one pedal arm that is journaled in the support for pivoting about a pivot axis spaced from the two ends of the pedal arm. A foot plate is fixed to a portion of the pedal arm on one side of the pivot axis. A motion-transmitting element is joined firstly to the portion of the pedal arm on the other side of the pivot axis and secondly to a pivotally mounted lever that pivotally actuates an operating device that is fixed to an element spaced from the support.

BRIEF DESCRIPTION OF DRAWINGS

The invention will now be described in greater detail in the following way, by example only, and with reference to the attached drawings, in which.

DETAILED DESCRIPTION

Figure 1:
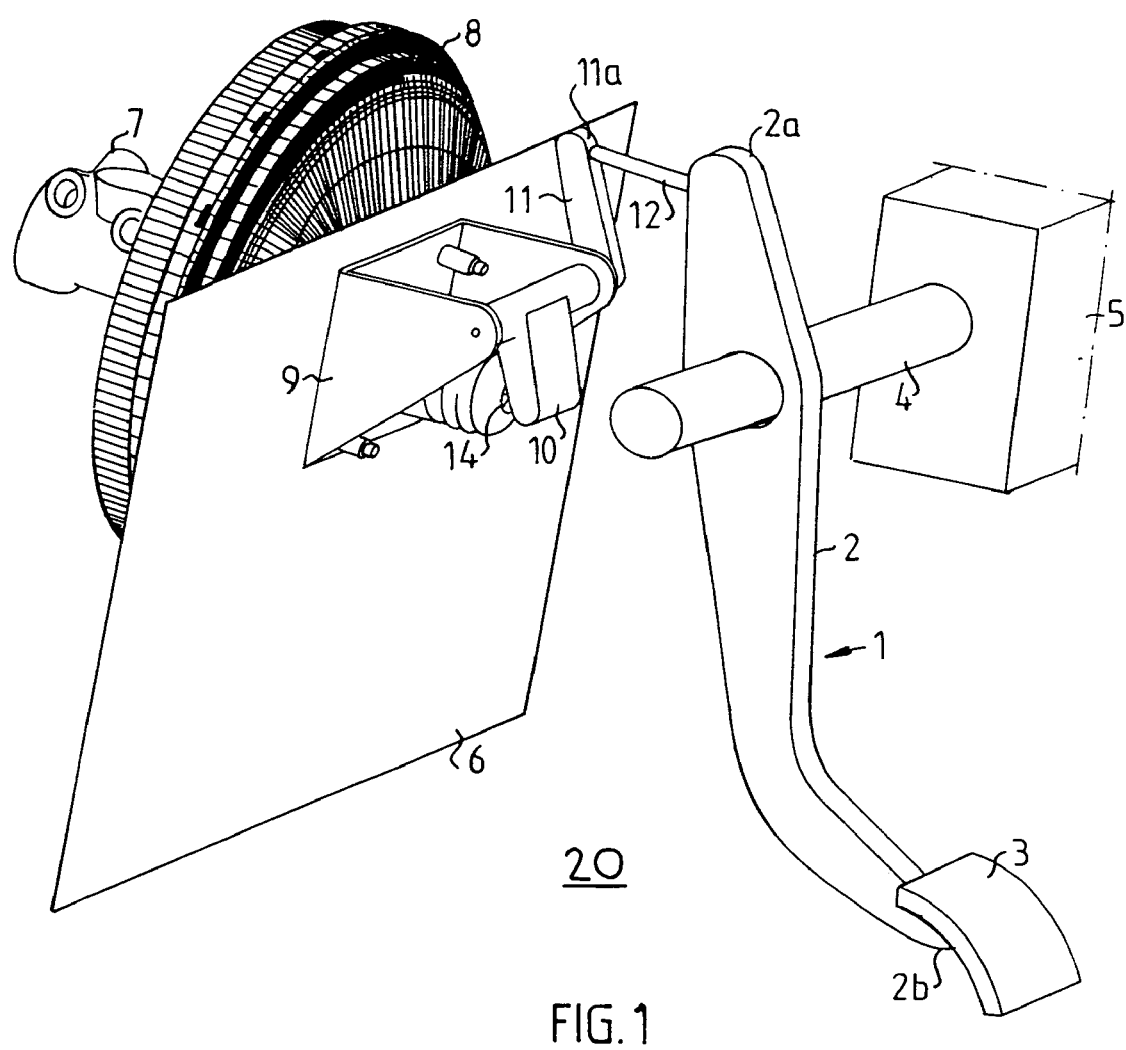
FIG. 1 is a perspective view of a foot pedal assembly configured according to the present invention.
Figure 2:
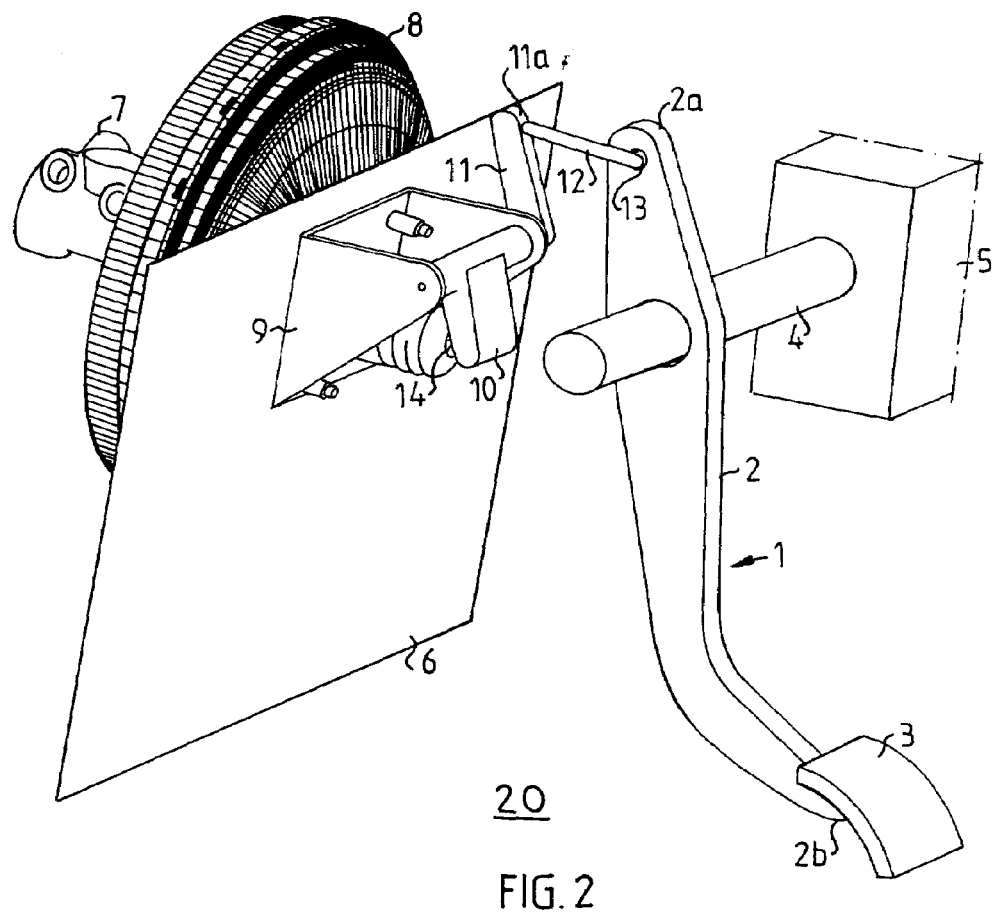
FIG. 2 is a perspective view of an alternative foot pedal assembly configured according to the present invention.

The invention will be described below in more detail with reference to examples shown in the accompanying drawings. As indicated above, FIG. 1 shows a schematic representation of a first embodiment of a pedal arrangement according to the invention and FIG. 2 shows a corresponding schematic representation of a second embodiment of a pedal arrangement according to the invention.

In the figures, the reference numeral 1 designates a brake pedal having a pedal arm 2 and a foot plate 3. At a point between the arm's 2 upper and lower ends 2a and 2b respectively, the pedal arm 2 is pivotally mounted on a shaft 4, that is fixed to a support element 5. The support element 5 constitutes a portion of the body structure of the vehicle that is spaced from a cowl wall 6. In this case, the cowl wall 6 separates the cab space (20) from the engine compartment. On the side of the wall 6 facing the engine compartment, there is a main brake cylinder 7 with a servo unit 8. A bracket 9 is fixed on the opposite side of the wall 6. A rocker arm 10 is journaled in the bracket 9 and is rigidly joined to a lever 11.

At the upper end 11a of the lever 11, a flexible rod 12 is rigidly fixed. The rod 12 can be a steel cable, which is welded fast to the lever 11. In the embodiment shown in FIG. 1, the rod 12 is also rigidly fixed to the upper end 2a of the pedal arm 2. If the distance is short between supporting element 5 and the wall 6, it can be necessary to pivotally join at least one end of the rod 12 relative to the associated arm. In FIG. 2 an alternative is shown in which the rod 12 is pivotally joined to the upper end of the pedal arm 2 via a pivot pin 13.

The distal end portion of the rocker arm 10 is disposed directly in front of an end of an actuator rod 14, which extends through the wall 6 and into the servo unit 8. During normal braking, when the foot plate 3 is depressed so that the pedal arm 2 rotates clockwise, the lever 11 is also pivoted clockwise under the influence of the tensile force from the rod 12, whereupon the rocker arm 10 displaces the actuator rod towards the servo unit. If the vehicle should be involved in a head-on collision resulting in displacement of the wall 6 with the servo unit 8 so that the distance to the supporting element 5 is reduced, the rod 12 will be subjected to a compressive force which strives to rotate the pedal arm in the same direction as for normal braking. The rod 12, which, as was mentioned above, can be a steel cable, is dimensioned so that it can only transmit insignificant compressive force before it bends. As a result, if there is a foot under the foot plate 3 at the moment of collision, there will be no risk of being clamped fast and trapped.

Figure 3:
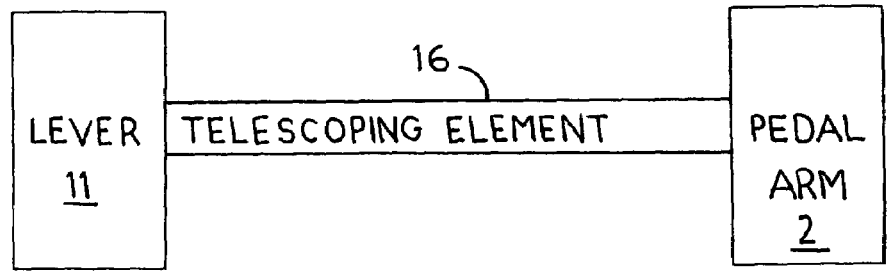
FIG. 3 is a schematic block diagram view of an alternative foot pedal assembly configured according to the present invention.

Within the scope of the invention, and referring now to FIG. 3, it is also conceivable to have, instead of a flexible element such as a steel cable, a rigid telescoping element 16, which is pivotally joined (or welded) to the respective arms 11 and 2 at either or both ends. Both parts of the element can be pushed together when they are subjected to a compressive force. Here the advantages of the rigid fixation are lost, however.

The invention claimed is:

1. Pedal arrangement in a vehicle cab space, comprising:
    a support fixed in the cab space;
    at least one pedal arm having two ends, wherein the pedal arm is journaled in the support for pivoting about a pivot axis spaced between the two ends of the pedal arm;
    a foot plate fixed to a first portion of the pedal arm on one side of the pivot axis;
    a motion-transmitting element disposed wholly within the cab space, wherein the motion-transmitting element is joined firstly to a second portion of the pedal arm on the other side of the pivot axis from the foot plate and wherein the motion-transmitting element is joined secondly to a pivotally mounted lever that is configured so that pivotation thereof actuates an operating device; and
    wherein the motion-transmitting element is disposed so that the distance between the motion-transmitting element's respective attachment points to the pedal arm and the lever is maintained at least substantially constant when there is a tensile force on the element and is allowed to be non-fixedly shortened when there is compressive force on the element; and
    wherein the motion-transmitting element is rigidly fixed to at least one of the pedal arm and the lever, and is pivotally joined to the other of the pedal arm and the lever.

2. The pedal arrangement according to claim 1, wherein the motion-transmitting element is an elongated flexible element.

3. The pedal arrangement according to claim 1, wherein the motion-transmitting element is a metal cable.

4. The pedal arrangement according to claim 1, wherein the motion-transmitting element is rigidly fixed both to the pedal arm and to the lever.

5. The pedal arrangement according to claim 1, wherein the lever is joined to a rocker arm, which, when the lever is pivoted, acts on an actuator rod for a brake servo unit, which is located on the outside of an intermediate wall on the inside of which the support is located spaced from the intermediate wall.

6. A pedal arrangement in a vehicle cab space, said arrangement comprising:
    a brake pedal arm pivotally connected to the vehicle at a pivot point located on the brake pedal arm, the pivot point being positioned between an upper end and a lower end of the brake pedal arm; and
    a motion-transmitting element disposed wholly within the cab space and being connected between the brake pedal arm and a pedal actuated operating device, the motion-transmitting element supporting tensile forces imposed thereupon, and non-fixedly collapsing under compressive forces imposed thereupon.

7. The brake pedal arrangement according to claim 6, wherein the motion-transmitting element comprises a cable.

8. The brake pedal arrangement according to claim 6, wherein the motion-translating element comprises a bendable member.

9. The brake pedal arrangement according to claim 6, wherein the motion-transmitting element comprises a telescoping member.

10. The brake pedal arrangement according to claim 9, wherein the telescoping member is pivotally connected to the brake pedal arm.

11. The brake pedal arrangement according to claim 9, wherein the telescoping member is welded at least at one end thereof between the brake pedal arm and the pedal actuated operating device.

12. The brake pedal arrangement according to claim 6, wherein the motion-transmitting element is fixed at least at one end thereof between the brake pedal arm and the pedal actuated operating device.

13. The brake pedal arrangement according to claim 6, wherein the motion-transmitting element is welded at least at one end thereof between the brake pedal arm and the pedal actuated operating device.

14. The brake pedal arrangement according to claim 6, wherein the motion-transmitting element is pivotally connected at least at one end thereof between the brake pedal arm and the pedal actuated operating device.

15. The brake pedal arrangement according to claim 6, wherein the pedal actuated operating device comprises a pressure actuated servo unit for affecting brake pressure application.

16. A pedal arrangement for a vehicle cab space, said arrangement comprising:
    a pivot axis connected to a support fixed within the vehicle cab space;
    a pedal arm arranged to be pivotally connected to the pivot axis at a pivot point located on the pedal arm, the pivot point being positioned between an upper end and a lower end of the pedal arm;
    a pedal actuated operating device including a bracket fixed within the vehicle cab space, a rocker arm journaled in the bracket and a lever arm connected to the rocker arm; and
    a motion-transmitting element disposed wholly within the cab space and being connected between the pedal arm and the lever arm of the pedal actuated operating device, wherein the motion-transmitting element supports tensile forces imposed upon the motion-transmitting element, and wherein the motion-transmitting element non-fixedly collapses under compressive forces imposed upon the motion-transmitting element.

17. The brake pedal arrangement according to claim 16, wherein the motion-transmitting element is selected from the group consisting of a cable, a bendable member or a telescoping member.

18. The brake pedal arrangement according to claim 16, wherein the motion-transmitting element is rigidly fixed to at least one of the pedal arm and the lever arm, and is pivotally joined to the other of the pedal arm and the lever arm.

* * * * *

UNITED STATES PATENT AND TRADEMARK OFFICE
CERTIFICATE OF CORRECTION

| | | |
|---|---|---|
| PATENT NO. | : 7,131,348 B2 | Page 1 of 1 |
| APPLICATION NO. | : 09/681441 | |
| DATED | : November 7, 2006 | |
| INVENTOR(S) | : Peter Fall | |

It is certified that error appears in the above-identified patent and that said Letters Patent is hereby corrected as shown below:

IN THE CLAIMS:

Column 4, line 11, change "motion-translating" to --motion-transmitting--.

Signed and Sealed this

Thirtieth Day of January, 2007

JON W. DUDAS
*Director of the United States Patent and Trademark Office*